United States Patent
Wang et al.

(10) Patent No.: US 11,967,706 B2
(45) Date of Patent: Apr. 23, 2024

(54) COMPOSITE METAL OXIDE MATERIAL AND PREPARATION METHOD THEREOF, POSITIVE ELECTRODE PLATE, SECONDARY BATTERY, BATTERY MODULE, BATTERY PACK AND ELECTRICAL DEVICE

(71) Applicant: CONTEMPORARY AMPEREX TECHNOLOGY CO., LIMITED, Ningde (CN)

(72) Inventors: Bangrun Wang, Ningde (CN); Zhenguo Zhang, Ningde (CN); Chongheng Shen, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/933,120

(22) Filed: Sep. 18, 2022

(65) Prior Publication Data
US 2023/0057959 A1 Feb. 23, 2023

Related U.S. Application Data

(63) Continuation of application No. PCT/CN2021/111682, filed on Aug. 10, 2021.

(51) Int. Cl.
*H01M 4/36* (2006.01)
*C01G 49/00* (2006.01)
(Continued)

(52) U.S. Cl.
CPC ........ *H01M 4/366* (2013.01); *C01G 49/0027* (2013.01); *C01G 49/0045* (2013.01);
(Continued)

(58) Field of Classification Search
None
See application file for complete search history.

(56) References Cited

U.S. PATENT DOCUMENTS

| 2010/0221596 A1 | 9/2010 | Huggins et al. |
| 2019/0267615 A1 | 8/2019 | Xie et al. |

FOREIGN PATENT DOCUMENTS

| CN | 101997113 A | 3/2011 |
| CN | 103811736 A | 5/2014 |

(Continued)

OTHER PUBLICATIONS

International Search Report and Written Opinion received in International Application PCT/CN2021/111682 dated Oct. 28, 2021.
(Continued)

*Primary Examiner* — Maria Laios
*Assistant Examiner* — Angela J Martin
(74) *Attorney, Agent, or Firm* — Kilpatrick Townsend & Stockton LLP

(57) ABSTRACT

A composite metal oxide material and a preparation method thereof, a positive electrode plate, a secondary battery, a battery module, a battery pack and an electrical device are provided. The composite metal oxide material includes a central core and a coating layer on the surface of the central core, in which the central core material has a chemical formula of $Li_5Fe_xM_{1-x}O_4$, $0.6 \leq x \leq 1$; the coating layer material has a chemical formula of $LiMO_2$, M is one or more metal elements with +3 valence, and the absolute value of the difference between the +3-valence ion radius of Fe and the +3-valence ion radius of M is $\leq 0.02$ nm. The composite metal oxide material of the present disclosure makes the secondary battery have high charge capacity, high discharge capacity and long cycle life.

15 Claims, 5 Drawing Sheets

(51) Int. Cl.
*C01G 51/00* (2006.01)
*C01G 53/00* (2006.01)
*H01M 4/04* (2006.01)
*H01M 4/48* (2010.01)
*H01M 4/485* (2010.01)
*H01M 4/50* (2010.01)
*H01M 4/505* (2010.01)
*H01M 4/52* (2010.01)
*H01M 4/525* (2010.01)
*H01M 10/05* (2010.01)
*H01M 10/0525* (2010.01)
*H01M 4/02* (2006.01)

(52) U.S. Cl.
CPC ......... *C01G 49/0072* (2013.01); *C01G 51/42* (2013.01); *C01G 53/42* (2013.01); *H01M 4/0471* (2013.01); *H01M 4/485* (2013.01); *H01M 4/505* (2013.01); *H01M 4/525* (2013.01); *H01M 10/0525* (2013.01); *C01P 2002/50* (2013.01); *C01P 2004/03* (2013.01); *C01P 2004/61* (2013.01); *C01P 2004/84* (2013.01); *C01P 2006/40* (2013.01); *H01M 2004/021* (2013.01); *H01M 2004/028* (2013.01)

(56) References Cited

FOREIGN PATENT DOCUMENTS

| | | | | |
|---|---|---|---|---|
| CN | 106784632 A | 5/2017 | | |
| CN | 108400321 A | 8/2018 | | |
| CN | 108807860 | * 11/2018 | ........ | H01M 10/0525 |
| CN | 108807860 A | 11/2018 | | |
| CN | 109216688 A | 1/2019 | | |
| CN | 109390563 A | 2/2019 | | |
| CN | 109428067 A | 3/2019 | | |
| CN | 110459762 | * 11/2019 | ............ | H01M 4/505 |
| CN | 110854382 A | 2/2020 | | |
| CN | 111162258 A | 5/2020 | | |
| CN | 112164796 | * 1/2021 | ........ | H01M 10/0525 |
| CN | 112164796 A | 1/2021 | | |
| CN | 112186143 A | 1/2021 | | |
| KR | 10-20130079109 A | 7/2013 | | |
| WO | 2015115052 A1 | 8/2015 | | |
| WO | WO 2021088166 | * 5/2021 | ............ | H01M 10/42 |

OTHER PUBLICATIONS

GB/T 19077-2016/ISO 13320:2009, "Particle size analysis-Laser diffraction methods", published Feb. 24, 2016.

Extended European Search Report received in European Application 21928366.0, dated May 10, 2023.

Ding Keqiang et al: "A Solid-State Method for Preparing Cobalt-Doped Li 5 FeO4 Using Fe(NO3)3 as the Iron Source", Int. J. Electrochem. Sci. International Journal, vol. 6, Jan. 1, 2011 (Jan. 1, 2011), pp. 2859-2868, XP093042310.

Biesuz Mattia et al: "Thermally-insulated flash sintering", Scripta Materialia, vol. 162, Nov. 8, 2018 (Nov. 8, 2018), pp. 99-102, XP093042311, NL, ISSN: 1359-6462, DOI: 10.1016/j.scriptamat.2018.10.042.

Wang Xilin et al: "Flash sintering of ZnO ceramics at 50° C. under an AC field", Ceramics International, Elsevier, Amsterdam, NL, vol. 45, No. 18, Aug. 14, 2019 (Aug. 14, 2019), pp. 24909-24913, XP085862897, ISSN: 0272-8842, DOI: 10.1016/J.CERAMINT.2019.08.142 [retrieved on Aug. 14, 2019].

Notice of Reasons for Refusal eceived in the corresponding Japanese Application 2022-551621, dated Aug. 1, 2023.

Request for the Submission of an Opinion received in the corresponding Korean Application 10-2022-7029445, mailed Feb. 16, 2024.

* cited by examiner

COMPOSITE METAL OXIDE MATERIAL AND PREPARATION METHOD THEREOF, POSITIVE ELECTRODE PLATE, SECONDARY BATTERY, BATTERY MODULE, BATTERY PACK AND ELECTRICAL DEVICE

CROSS-REFERENCE TO RELATED APPLICATIONS

This application is a continuation of International Application PCT/CN2021/111682, filed Aug. 10, 2021 and entitled "COMPOSITE METAL OXIDE MATERIAL AND PREPARATION METHOD THEREOF, POSITIVE ELECTRODE PLATE, SECONDARY BATTERY, BATTERY MODULE, BATTERY PACK AND ELECTRICAL DEVICE", which is are incorporated herein by reference in their entireties.

TECHNICAL FIELD

This disclosure belongs to the technical field of secondary batteries, and specifically relates to a composite metal oxide material and a preparation method thereof, a positive electrode plate, a secondary battery, a battery module, a battery pack and an electrical device.

BACKGROUND

In recent years, with the disclosure and promotion of secondary batteries in industries such as various electronic products and new energy vehicles, their energy density has received more and more attention. However, during the first charging process of the secondary battery, an SEI (solid electrolyte interface) film is inevitably formed on the surface of the negative active material, resulting in irreversible consumption of active ions, which makes it difficult to eliminate the irreversible capacity loss of the secondary battery. Thus it brings challenges to the improvement of energy density of secondary batteries.

SUMMARY

The purpose of the present disclosure is to provide a composite metal oxide material and a preparation method thereof, a positive electrode plate, a secondary battery, a battery module, a battery pack and an electrical device, aiming to make the secondary battery have high charge capacity, high discharge capacity and long cycle life.

In order to realize the above-mentioned object of the present disclosure, a first aspect of the disclosure provides a composite metal oxide material for positive electrode lithium supplementing, and the composite metal oxide material includes a central core and a coating layer on the surface of the central core, in which the central core material has a chemical formula of $Li_5Fe_xM_{1-x}O_4$, $0.6 \leq x \leq 1$; the coating layer material has a chemical formula of $LiMO_2$, M is one or more metal elements with +3 valence, and the absolute value of the difference between the +3-valence ion radius of Fe and the +3-valence ion radius of M is $\leq 0.02$ nm.

Doping element M can partly replace Fe element in $Li_5FeO_4$ lattice structure, making the central core material $Li_5Fe_xM_{1-x}O_4$ form the solid solution in which the ternary metals coexist, and making the bulk phase structure of the central core material $Li_5Fe_xM_{1-x}O_4$ more stable. Thus the composite metal oxide material of the present disclosure can further prevent the structural damage caused by the repeated charging and discharging of the battery, which is beneficial to the exertion of the gram capacity. The composite metal oxide material of the present disclosure uses $LiMO_2$ as the coating layer material, which can not only effectively isolate the central core material from direct contact with moisture and carbon dioxide in the air, prevent the central core material from deteriorating during storage and transportation, but also prevent the central core material from being corroded by water or other acidic substances in the electrolyte and failing. $LiMO_2$ has a layered structure, which can make active lithium in the central core material can be freely extracted. After the central core material is delithiated into a deactivated material, $LiMO_2$ is still active, which will not hinder the transport of active lithium in the positive active material and the positive electrode film layer. Therefore, the composite metal oxide material of the present disclosure can have a significantly improved charging gram capacity.

According to the present disclosure, the metal element M contained in the central core material $Li_5Fe_xM_{1-x}O_4$ and the coating layer material $LiMO_2$ is same. The central core and the coating layer can be combined by chemical bonding, and interface can have higher bonding strength, and the coating effect of the coating layer to the central core is better. In addition, the transport performance of active lithium at the interface is better, which is conducive to the efficient extraction of active lithium from the central core material $Li_5Fe_xM_{1-x}O_4$, and gives full play to the advantages of the high charging gram capacity of the composite metal oxide material.

The absolute value of the difference between the +3-valence ion radius of M and the +3-valence ion radius of Fe is controlled within a suitable range, and the central core material have a more ideal doping degree can be obtained, and then a composite metal oxide material with a higher charging gram capacity can be obtained.

Optionally, the absolute value of the difference between the +3-valence ion radius of Fe and the +3-valence ion radius of M is $\leq 0.01$ nm. More specifically, the absolute value of the difference between the +3-valence ion radius of Fe and the +3-valence ion radius of M is $\leq 0.005$ nm.

In any embodiment of the present disclosure, $0.8 \leq x \leq 1$. Optionally, $0.85 \leq x \leq 0.95$.

In any embodiment of the present disclosure, the +3-valence ion radius of M is from 0.040 nm to 0.070 nm. Optionally, the +3-valence ion radius of M is from 0.050 nm to 0.060 nm.

The +3-valence ion radius of M within a suitable range can make the central core material have a more ideal doping degree, so that the charging gram capacity of the composite metal oxide material can be improved.

In any embodiment of the disclosure, the composite metal oxide material also includes: a transition layer, located between the central core and the coating layer, and the molar ratio of Fe to M in the transition layer is less than the molar ratio of Fe to M in the central core material $Li_5Fe_xM_{1-x}O_4$.

Optionally, in the transition layer, the molar ratio of Fe to M is $\leq 2$. More specifically, the molar ratio of Fe to M in the transition layer is $\leq 1.5$.

In any embodiment of the present disclosure, the thickness of the thickest part of the transition layer is $H_{max}$, and $H_{max}$ is $\leq 1$ μm. Optionally, $H_{max}$ is from 0.1 μm to 1 μm.

In any embodiment of the present disclosure, M is selected from one or more in Al, Ni, Co, Mn, Cr, Cu, Nb, Ga, Mo, Ru, Rh, and Ir. Optionally, M is selected from one or more of Al, Ni, Co, Mn, Cu, Mo, and Ga. More specifically, M is selected from one or more of Al, Ni, Co, Cu, and Ga.

In any embodiment of the present disclosure, M is selected from one or more of Al, Cu, and Ga.

When M is selected from one or more of the above-mentioned elements, it can ensure that the +3-valence ion radius of M is within a suitable range, thus a central core material with a more ideal doping degree can be obtained, and then a composite metal oxide materials having higher charging gram capacity can be obtained.

In any embodiment of the present disclosure, based on the total mass of the composite metal oxide material, the mass percentage of $LiMO_2$ is from 0.5% to 5%. Optionally, the mass percentage of $LiMO_2$ is 1% to 3%.

The mass percentage of $LiMO_2$ within a suitable range, can make the coating layer uniform, dense, and the composite metal oxide material having a suitable thickness can better have both high charging gram capacity and high stability.

In any embodiment of the present disclosure, the composite metal oxide material has a volume average particle diameter Dv50 of from 2 μm to 8 μm. Optionally, the volume average particle diameter Dv50 of the composite metal oxide material is from 3 μm to 6 μm.

When the volume average particle size Dv50 of the composite metal oxide material is in a suitable range, the advantage of the high charging gram capacity of the composite metal oxide material can be fully exerted.

The second aspect of the present disclosure provides a method for preparing the composite metal oxide material, including at least the following steps: providing Li source, Fe source, M source, wherein the absolute value of the difference between the +3-valence ion radius of Fe and the +3-valence ion radius of M is ≤0.02 nm, and after mixing the above raw materials, raising the temperature, and subjecting the mixture to a thermal insulation sintering for a period of time to obtain a composite metal oxide material. The composite metal oxide material includes a central core and a coating layer on the surface of the central core, the chemical formula of the central core material is $Li_5Fe_xM_{1-x}O_4$, 0.6≤x≤1, and the chemical formula of the coating layer material is $LiMO_2$.

The method for preparing the composite metal oxide material of the present disclosure is an in-situ coating method, and the doping and in-situ coating of $Li_5FeO_4$ is directly completed by one-step synthesis, which avoids the problems of complex synthesis process and poor interface bonding strength in multi-step synthesis.

The preparation method of the composite metal oxide material according to the present disclosure is simple in technique and high in production efficiency.

In any embodiment of the present disclosure, the provided Li source, Fe source, M source are mixed at a ratio of a:b:c (molar ratio of Li, Fe, M element), in which 5≤a≤6, 0.6≤b≤1, 0≤c≤0.4.

Optionally 5.2≤a≤5.8, more specifically 5.4≤a≤5.6.

Optionally 0.8≤b≤1, more specifically 0.85≤b≤0.95.

Optionally 0≤c≤0.2, more specifically 0.05≤c≤0.15.

In any embodiment of the present disclosure, the thermal insulation sintering process adopts a two-stage thermal insulation sintering process, and after the raw materials are mixed, the mixture is once warmed up to a first thermal insulation sintering temperature and sintered for a period of time, and is then warmed up to a second thermal insulation sintering temperature and sintered for a period of time.

In the composite metal oxide material prepared by two-stage thermal insulation sintering process, the distribution of doping element M is more uniform in the central core material, and the coating effect of the coating layer to the central core is also better, thereby ensuring that the prepared composite metal oxide materials can have higher charging gram capacities.

In any embodiment of the present disclosure, a first heating rate is from 2° C./min to 10° C./min. Optionally, the first heating rate is from 4° C./min to 8° C./min.

In any embodiment of the present disclosure, the temperature of a first thermal insulation sintering is from 500° C. to 800° C. Optionally, the temperature of the first thermal insulation sintering from is 520° C. to 700° C.

When the temperature of the first thermal insulation sintering is within a suitable range, a uniform solid solution $Li_5Fe_xM_{1-x}O_4$ can be formed, and the composite metal oxide material can be guaranteed to have a high charging gram capacity.

In any embodiment of the present disclosure, a second heating rate is from 2° C./min to 10° C./min. Optionally, the second heating rate is from 4° C./min to 8° C./min.

In any embodiment of the present disclosure, the temperature of a second thermal insulation sintering is from 600° C. to 1000° C. Optionally, the temperature of the second thermal insulation sintering is from 650° C. to 900° C.

When the temperature of the second thermal insulation sintering is within a suitable range, the coating effect of the coating layer on the central core is better, which is more conducive to the exertion of the high charging gram capacity of the composite metal oxide material.

A third aspect of the present disclosure provides a positive electrode plate, including the composite metal oxide material of the first aspect of the present disclosure and the composite metal oxide material prepared by the method of the second aspect of the present disclosure.

In any embodiment of the present disclosure, the positive electrode plate further includes a positive active material, and based on the mass of the positive active material, the mass percentage of the composite metal oxide material is less than or equal to 20% (≤20%). Optionally, the mass percentage of the composite metal oxide material is from 1% to 20%. More specifically, the mass percentage of the composite metal oxide material is from 1% to 10%.

A fourth aspect of the present disclosure provides a secondary battery including the positive electrode plate of the third aspect of the present disclosure.

A fifth aspect of the present disclosure provides a battery module including the secondary battery of the fourth aspect of the present disclosure.

A sixth aspect of the present disclosure provides a battery pack including one of the secondary battery of the fourth aspect of the present disclosure and the battery module of the fifth aspect of the present disclosure.

A seventh aspect of the present disclosure provides an electrical device including at least one of the secondary battery of the fourth aspect of the present disclosure, the battery module of the fifth aspect of the present disclosure, and the battery pack of the sixth aspect of the present disclosure.

The battery module, battery pack and electrical device of the present disclosure include the secondary battery provided by the present disclosure, and thus have at least the same advantages as the secondary battery.

The composite metal oxide material of the present disclosure can have significantly improved charging gram capacity, enabling the secondary battery of the present disclosure to simultaneously have high charge capacity, high discharge capacity and long cycle life.

DESCRIPTION OF THE DRAWINGS

In order to illustrate the technical solutions of the embodiments of the present disclosure more clearly, the accompanying drawings used in the embodiments of the present disclosure will be briefly introduced below. Obviously, the accompanying drawings described below are only some implementations of the present disclosure. By way of example, for those of ordinary skill in the art, other drawings can also be obtained according to the drawings without any creative effort.

DETAILED DESCRIPTION

Figure 1:
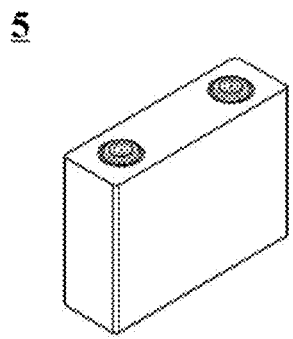
FIG. 1 is a schematic diagram of an embodiment of a secondary battery according to the present disclosure.

Hereinafter, embodiments of the composite metal oxide material and the preparation method thereof, the positive electrode plate, the secondary battery, the battery module, the battery pack and the electrical device that specifically disclose the present disclosure will be described in detail with reference to the accompanying drawings as appropriate. However, unnecessary detailed descriptions may be omitted in some cases, for example the detailed description of a well-known item or the repetitive description of an actual identical structure so as to prevent the following description from becoming unnecessarily redundant and to facilitate understanding by those skilled in the art. In addition, the drawings and the following description are provided for those skilled in the art to fully understand the present disclosure, and are not intended to limit the subject matter described in the claims.

The "ranges" disclosed in this disclosure are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present disclosure, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present disclosure can be combined with each other to form a new technical solution, and such a technical solution should be considered to be included in the disclosure of the present disclosure.

Unless stated otherwise, all technical features and optional technical features of the present disclosure can be combined with each other to form a new technical solution, and such a technical solutions should be considered to be included in the disclosure of the present disclosure.

Unless stated otherwise, all steps of the present disclosure can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprising" and "comprising" mentioned in the present disclosure means that it is drafted in an open mode or in a close mode. For example, the transition phases "comprising" and "comprising" may mean that other components not listed may also be included or contained, or only the listed components may be included or contained.

In the present disclosure herein, unless otherwise stated, the term "or" is inclusive. For example, the phrase "A or B" means A, B, or both A and B". More specifically, either of the following conditions meets "A or B": A is true (or present) and B is false (or absent); A is false (or absent) and B is true (or present); or both A and B are true (or present).

Composite Metal Oxide Materials

In order to meet the requirements of the secondary battery in terms of high energy density, a lithium-supplementing technology can be used to increase the active lithium content to compensate for the loss of active lithium during the first charge process of the secondary battery. At present, the main and highly mature technology is the negative electrode lithium supplementation process, such as covering a layer of lithium metal on the surface of the negative electrode plate through lithium powder or lithium foil. However, the chemical properties of metallic lithium are very active, and the requirements for the environment and equipment are high, and there will be high safety risks in the lithium-supplementing process. Compared with the negative electrode lithium-supplementing process, the positive electrode lithium-supplementing process has higher safety and reduces the requirements for environmental control. The positive lithium-supplementing process can be to add lithium-rich materials (such as lithium-rich transition metal oxides) to the positive electrode plate to increase additional active lithium. During the formation of the battery or the first charge process, this part of the active lithium is extracted from the lithium-rich material to compensate for the loss of active lithium caused by the formation of the SEI film of the negative active material.

$Li_5FeO_4$ has a very high theoretical charging capacity, and almost all of the capacity is irreversible. After the battery is charged for the first time, it is rapidly deactivated and no longer participates in subsequent charge-discharge reactions. Therefore, $Li_5FeO_4$ can be used as a positive lithium-supplementing agent to supplement the loss of active lithium during the first charge process of the battery. However, the high lithium content of $Li_5FeO_4$ results in strong activity, instability in the air, and easy reaction with moisture and carbon dioxide in the environment. Therefore, $Li_5FeO_4$ needs to be stored and used in an inert atmosphere, which reduces production efficiency and increases production cost.

Adopting carbon material or metal oxide (for example $Al_2O_3$, $TiO_2$, $ZrO_2$ etc.) to coat $Li_5FeO_4$, can isolate external environment and avoid direct contact of $Li_5FeO_4$ with water and carbon dioxide in the air to improve the stability. However, the surface coating process is complicated, which increases the production cost; the electrochemically inactive coating layer does not have the function of conducting active lithium, which is not conducive to the extraction of active lithium from $Li_5FeO_4$, and will reduce the charging capacity of $Li_5FeO_4$. Therefore, the electrochemically inactive coating layer not only has limited improvement in battery's cycle life, but also reduces the energy density of the battery.

In order to solve the problem that $Li_5FeO_4$ is unstable in the air as a positive lithium-supplementing agent and easily reacts with moisture and carbon dioxide in the environment, the inventors have conducted in-depth research to provide a composite metal oxide materials having a stable structure, with significantly improved charging gram capacity, and suitable for production. The composite metal oxide material of the present disclosure can be used as a positive electrode lithium-supplementing agent and applied in a positive electrode plate and a secondary battery, so that the secondary battery has high charging capacity, high discharging capacity and long cycle life at the same time.

Specifically, the composite metal oxide material of the present disclosure comprises a central core and a coating layer on the surface of the central core, and the chemical formula of the central core material is $Li_5Fe_xM_{1-x}O_4$, in which $0.6 \leq x \leq 1$, and the chemical formula of the coating layer material is $LiMO_2$, in which M is one or more metal elements with +3 valence, and the absolute value of the difference between the +3-valence ion radius of Fe and the +3-valence ion radius of M is less than or equal to 0.02 nm.

The composite metal oxide material of the present disclosure is a composite metal oxide material with M-doped $Li_5FeO_4$ as the central core material and $LiMO_2$ as the coating layer material, and has significantly improved charging gram capacity. First, the doping element M can partly replace the Fe element in the lattice structure of $Li_5FeO_4$, so that the central core material $Li_5Fe_xM_{1-x}O_4$ forms a solid solution in which the ternary metals coexist, making the bulk phase structure of the central core material $Li_5Fe_xM_{1-x}O_4$ more stable. Therefore, the composite metal oxide material of the present disclosure can better prevent the structural damage caused by the repeated charging and discharging of the battery, which is beneficial to the exertion of the gram capacity. Second, the composite metal oxide material of the present disclosure uses $LiMO_2$ as the coating layer material, which can not only effectively isolate the central core material from direct contact with moisture and carbon dioxide in the air so as to prevent the central core material from deteriorating during storage and transportation, but also prevent the central core material from failure owing to corrosion by water or other acidic substances in the electrolyte. Third, the composite metal oxide material of the present disclosure uses as the coating layer material $LiMO_2$ that has a layered structure, allowing active lithium in the central core material to freely deintercalate. After the central core material is delithiated into a deactivated material, $LiMO_2$ is still active, which will not hinder the transport of active lithium in the positive active material and the positive electrode film layer. Therefore, the composite metal oxide material of the present disclosure can have a significantly improved charging gram capacity.

In the composite metal oxide material of the present disclosure, the metal element M contained in the central core material $Li_5Fe_xM_{1-x}O_4$ and the coating layer material $LiMO_2$ is same, and in central core material $Li_5Fe_xM_{1-x}O_4$ and coating layer material $LiMO_2$, M can either represents the same one metal element, or represents the same multiple metal elements. When the central core material $Li_5Fe_xM_{1-x}O_4$ and the coating layer material $LiMO_2$ contain the same metal element M, an octahedral $MO_6$ can be formed at the interface between the central core and the coating layer. In this way, the central core and the coating layer are combined through chemical bonding, which can result in higher bonding strength at the interface and a better coating effect of the coating layer on the central core. In addition, the octahedral $MO_6$ can also improve the transport performance of active lithium at the interface between the central core and the coating layer. It is beneficial to the efficient extraction of active lithium from the central core material $Li_5Fe_xM_{1-x}O_4$, so that the advantages of the high charging gram capacity of the composite metal oxide material can be fully exploited.

The inventors have further found that whether M can effectively dope $Li_5FeO_4$ is related to the size of the +3-valence ion radius of M. When the difference between the +3-valence ion radii of M and Fe is too large, M cannot well enter the lattice structure of $Li_5FeO_4$ to partly replace the Fe element, and M and $LisFeO_4$ cannot form a solid solution $Li_5Fe_xM_{1-x}O_4$ in which ternary metals coexist, which not only reduces the charging capacity of the central core material, but also increases the difficulty of extracting active lithium from the central core material. When the +3-valence ion radius of M is not much different from that of Fe, M is more likely to partly replace the Fe element in the lattice structure of $Li_5FeO_4$, thereby effectively doping $Li_5FeO_4$. By controlling the absolute value of the difference between the +3-valence ion radius of M and the +3-valence ion radius of Fe within an appropriate range, the inventors can obtain a central core material with a more desirable doping degree, and then can obtain composite metal oxide materials with a higher charging gram capacity.

The inventors also found that, in the composite metal oxide material, if the value of x is too small, that is to say, when the content of Fe element in the central core material is too low, the charging gram capacity of the composite metal oxide material can be significantly reduced, which cannot play a role in supplementing the loss of active lithium during the first charging of the battery. The inventors control the value of x in the central core material within an appropriate range, which can ensure that the composite metal oxide material has a significantly improved charging gram capacity.

The radius of the metal element includes the radius of the metal atom and the radius of the metal ion. The same metal element may form metal ions with different charges, wherein the radius of the high-valence metal ion is smaller than the radius of the low-valence metal ion. In the present disclosure, M can also be a variable-valence metal, and "+3-valence ion radius of M" refers to the ionic radius of M that has lost 3 outer electrons. M may have not only a valence of +3, but also a valence of +4, a valence of +5, a valence of +6, a valence of +7, and so on.

In some embodiments, the absolute value of the difference between the +3-valence ion radius of Fe and the +3-valence ion radius of M can be ≤0.02 nm, ≤0.018 nm, ≤0.015 nm, ≤0.012 nm, ≤0.01 nm, ≤0.008 nm, ≤0.005 nm, ≤0.002 nm, or 0 nm (i.e. the +3-valence ion radius of Fe is equal to the +3-valence ion radius of M).

In some embodiments, optionally, the absolute value of the difference between the +3-valence ion radius of Fe and the +3-valence ion radius of M is ≤0.01 nm. More specifically, the absolute value of the difference between the +3-valence ion radius of Fe and the +3-valence ion radius of M is ≤0.005 nm.

In some embodiments, the +3-valence ion radius of Fe is 0.055 nm, and the +3-valence ion radius of M can be from 0.035 nm to 0.075 nm. Optionally, the +3-valence ion radius of M is from 0.037 nm to 0.073 nm, from 0.040 nm to 0.070 nm, from 0.043 nm to 0.067 nm, from 0.045 nm to 0.065 nm, from 0.047 nm to 0.063 nm, from 0.050 nm to 0.060 nm, from 0.053 nm to 0.057 nm.

The +3-valence ion radius of M is in a suitable range, which can make the central core material have a more ideal doping degree, M can better enter the lattice structure of $Li_5FeO_4$ and partly replace the Fe element, and M and $Li_5FeO_4$ can also form solid solution $Li_5Fe_xM_{1-x}O_4$ in which ternary metals coexist, which can significantly improve the charging gram capacity of composite metal oxide materials.

In some embodiments, M can be selected from one or more of Al, Ni, Co, Mn, Cr, Cu, Nb, Ga, Mo, Ru, Rh, and Ir. Optionally, M can be selected from one or more of Al, Ni, Co, Mn, Cu, Mo, and Ga. More specifically, M can be selected from one or more of Al, Ni, Co, Cu, and Ga. When M is selected from one or more of the above elements, it can ensure that the +3-valence ion radius of M is within a suitable range, so that a central core material with a more ideal doping degree can be obtained, and then composite metal oxide materials having a higher charging gram capacity can be obtained.

The inventors unexpectedly found that when M is a variable-valence metal that can have multiple high valences (such as +3 valence, +4 valence, +5 valence, +6 valence, +7 valence, etc.), the coating material $LiMO_2$ will also release active lithium during the charging process of the battery, causing the coating material to undergo a phase change, from a layered structure to a spinel structure and then to a rock-salt phase structure. At this time active lithium becomes difficult to extract. Therefore, more particularly, M is selected from a metal element whose highest valence state is +3. Thus the coating layer material can maintain a stable layered structure during charging, which is convenient for the active lithium to be fully extracted from the central core material, improve the charging gram capacity of composite metal oxide materials. In some embodiments, optionally, M is selected from one or more of Al, Cu, and Ga.

In some embodiments, optionally, 0.8≤x≤1.

In some embodiments, optionally, x is 0.8~0.98, 0.82~0.98, 0.84~0.98, 0.85~0.98, 0.88~0.98, 0.90~0.98, 0.92~0.98, 0.95~0.98, 0.8~0.96, 0.82~0.96, 0.84~0.96, 0.85~0.96, 0.88~0.96, 0.90~0.96, 0.92~0.96, or 0.85~0.95. For example, x can be 0.8, 0.85, 0.9, or 0.95.

When the value of x is larger, the content of M in the central core material $Li_5Fe_xM_{1-x}O_4$ is smaller, M and $Li_5FeO_4$ may not be able to form a uniform solid solution, and the crystallinity of the composite metal oxide material will decrease to a certain extent, the charging gram capacity will also be reduced to a certain extent. When the value of x is controlled in an appropriate range, the composite metal oxide material can have a higher charging gram capacity.

In some embodiments, the composite metal oxide material further comprises: a transition layer, located between the central core and the coating layer, and the molar ratio of Fe to M in the transition layer is less than the molar ratio of Fe to M in the central core material $Li_5Fe_xM_{1-x}O_4$. The transition layer is formed by the interfusion of the central core and the coating layer. In the transition layer, the Fe element content gradually decreases from the position of the central core to the position of the coating layer.

When the composite metal oxide material of the present disclosure comprises a transition layer between the central core and the coating layer, an octahedral $MO_6$ can be formed at the position of the transition layer, and the central core and the coating layer can be connected by chemical bonding, and the bonding strength at the position of the transition layer is higher, and the coating effect of the coating layer on the central core is also better.

Optionally, the molar ratio of Fe to M in the transition layer is ≤2, ≤1.8, ≤1.5, ≤1.2, or ≤1.

In the composite metal oxide material of the present disclosure, the transition layer located between the central core and the coating layer may be a continuous layer structure or a discontinuous layer structure. The local position of the composite metal oxide material in the present disclosure may comprise a transition layer between the central core and the coating layer. Of course, the local position of the composite metal oxide material in the present disclosure may also not comprise the transition layer between the central core and the coating layer. The transition layer between the central core and the coating layer can have a uniform thickness or a non-uniform thickness.

In some embodiments, the transition layer between the central core and the coating layer is a continuous layered structure, and at this time, the coating layer has a better coating effect on the central core, which is more conducive to giving full play to the advantages of the high charging gram capacity of the composite metal oxide material.

In some embodiments, the thickness of the thickest part of the transition layer is $H_{max}$, and $H_{max}$ is ≤1 μm. Optionally, $H_{max}$ is from 0.1 μm to 1 μm. When the value of $H_{max}$ is in an appropriate range, it is beneficial to giving full play to the advantages of the high charging gram capacity of the composite metal oxide material.

In some embodiments, the transition layer material may include $Li_5Fe_xM_{1-x}O_4$ and $LiMO_2$.

In some embodiments, based on the total mass of the composite metal oxide material, the mass percentage of $LiMO_2$ may be from 0.5% to 5%. Optionally, the mass percentage of $LiMO_2$ is from 0.5% to 4.5%, from 0.5% to 4%, from 1% to 4%, from 1% to 3%, from 1% to 2.5%, from 1.5% to 2.5%, or from 1% to 2%. For example, the mass percentage of $LiMO_2$ can be 0.5%, 1%, 2%, 3%, 5%. When calculating "the mass percentage of $LiMO_2$", it includes not only the $LiMO_2$ in the coating layer, but also a small amount of $LiMO_2$ that may appear in the transition layer.

The inventors found that when the mass percentage of $LiMO_2$ is relatively low, it might not be possible to ensure that a uniform and dense coating is formed on the surface of the central core, the central core material cannot be fully isolated from the air, and the stability of the composite metal oxide material may be reduced, and the charging gram capacity may also be reduced. When the mass percentage of $LiMO_2$ is relatively high, the coating layer is likely to be too thick, which is not conducive to the extraction of active lithium in the central core material, and the charging gram capacity of the composite metal oxide material will also decrease. Through a lot of creative work, the inventors found that controlling the mass percentage of $LiMO_2$ in the present disclosure within an appropriate range can make the coating layer uniform, dense, and have a suitable thickness, and the composite metal oxide material can have significantly improved charging gram capacity.

In some embodiments, the volume average particle diameter Dv50 of the composite metal oxide material may be from 2 μm to 8 μm. Optionally, the volume average particle size Dv50 of the composite metal oxide material may be from 2 μm to 7 μm, from 3 μm to 7 μm, from 3 μm to 6 μm, from 3 μm to 5 μm, or from 4 μm to 5 μm. For example, the volume average particle diameter Dv50 of the composite metal oxide material may be 2 μm, 3 μm, 4.5 μm, 6 μm, or 8 μm.

The inventors found that when the particle size of the composite metal oxide material increases, the diffusion distance of active lithium increases, the ionic conductivity of the composite metal oxide material deteriorates, and the kinetic performance of the battery also decreases; when the particle size of the composite metal oxide increases, the difficulty of extracting active lithium from the central core during the charging process also increases, and the utilization rate of the charging gram capacity of the composite metal oxide material decreases. However, the particle size of the composite metal oxide material should not be too small, which will cause the specific surface area of the composite metal oxide material to be too large. In preparation of the positive electrode slurry, the composite metal oxide material is prone to agglomeration, which is not conducive to making full use of the charging gram capacity of composite metal oxide materials. When the volume average particle size Dv50 of the composite metal oxide material is controlled within the appropriate range, the advantage of the high charging capacity of the composite metal oxide material can be fully exploited.

In this disclosure, the volume average particle diameter Dv50 of the composite metal oxide material has the meaning known in the art, and can be measured by methods and instruments known in the art. In this disclosure, the volume average particle size Dv50 of the material is the particle size when the cumulative volume distribution percentage of the material reaches 50%, which can be determined by laser diffraction particle size analysis. For example, it can measured by referring to GB/T 19077-2016 (Particle size analysis-Laser diffraction methods), and using a laser particle size analyzer (for example, Malvern Mastersizer 2000E, UK).

In some embodiments, the charging gram capacity of the composite metal oxide material is ≥500 mAh/g. Optionally, the charging gram capacity of the composite metal oxide material is ≥600 mAh/g.

Method for Preparing Composite Metal Oxide Materials

A second aspect of the present disclosure provides a method for preparing the composite metal oxide material, comprising at least the following steps: providing Li source, Fe source, M source, wherein the absolute value of the difference between the +3-valence ion radius of Fe and the +3-valence ion radius of M is ≤0.02 nm, and after mixing the above raw materials, raising the temperature, and maintaining the temperature and sintering for a period of time to obtain a composite metal oxide material. The composite metal oxide material includes a central core and a coating layer on the surface of the central core, the chemical formula of the central core material is $Li_5Fe_xM_{1-x}O_4$, 0.6≤x≤1, and the chemical formula of the coating layer material is $LiMO_2$.

In the preparation method of the present disclosure, by mixing the raw materials for preparing the composite metal oxide material, through a thermal insulation sintering process, a composite metal oxide material comprising a central core, a coating layer and an optional transition layer is obtained. According to the composite metal oxide material obtained by the method of the present disclosure, the coating layer is uniform and dense, which can prevent the composite metal oxide material from deteriorating during storage and transportation, and at the same time, the composite metal oxide material has a remarkably improved charging gram capacity.

The preparation method of the composite metal oxide material of the present disclosure is an in-situ coating method, and the doping and in-situ coating of $Li_5FeO_4$ is directly completed by one-step synthesis, which avoids the problems of complex synthesis process and poor interface bonding strength in multi-step synthesis.

The preparation method of the composite metal oxide material according to the present disclosure is simple in technique and high in production efficiency.

When the composite metal oxide material obtained by preparation method of this disclosure is applied in positive electrode plates and batteries, batteries can have higher charge-discharge capacity and longer cycle life. In addition, the production process of the positive electrode plate is less difficult, and the positive electrode slurry is not prone to gel.

In some embodiments, the thermal insulation sintering process adopts a two-stage thermal insulation sintering process. For example, after mixed, the raw materials are first heated to a first thermal insulation sintering temperature and sintered for a period of time, and then are heated to a second thermal insulation sintering temperature and sintered for a period of time. In the two-stage thermal insulation sintering process, the temperature of the first thermal insulation sintering is lower than the temperature of the second thermal insulation sintering. In the first thermal insulation and sintering process, part of the M source, part of the Li source and the Fe source are solid-dissolved at a lower temperature to form a solid solution $Li_5Fe_xM_{1-x}O_4$ in which the ternary metals coexist, and the remaining M source and the remaining Li source are used in the second thermal insulation sintering process to form $LiMO_2$ which is used as a coating layer to coat the surface of the solid solution $Li_5Fe_xM_{1-x}O_4$ in situ. The composite metal oxide material prepared by the two-stage thermal insulation sintering process has a more uniform distribution of the doping element M in the central core material, and the coating effect of the coating layer on the central core is also better, so as to ensure the prepared composite metal oxide to have a higher charging gram capacity.

In some embodiments, the first heating rate may be from 2° C./min to 10° C./min. Optionally, the first heating rate is from 3° C./min to 10° C./min, from 4° C./min to 8° C./min, or from 5° C./min to 7° C./min.

In some embodiments, the temperature of the first thermal insulation sintering is from 500° C. to 800° C. Optionally, the temperature of the first thermal insulation sintering from is 520° C. to 800° C., from 520° C. to 750° C., from 520° C. to 700° C., from 550° C. to 700° C., or from 600° C. to 700° C. For example, the temperature of the first thermal insulation sintering can be 500° C., 600° C., 650° C., 700° C., or 800° C. The inventors found that if the temperature of a first thermal insulation sintering is too low, the solid solution $Li_5Fe_xM_{1-x}O_4$ may not be formed, and the crystallinity of $Li_5Fe_xM_{1-x}O_4$ is also low, which is not conducive to the exertion of the charging capacity of the composite metal oxide material. If the temperature is too high, the volatilization of the Li element in the Li source will increase, and the active lithium content in the central core material will decrease, which is not conducive to the exertion of the charging capacity of the composite metal oxide material. When the temperature of the first thermal insulation sintering is within the suitable range, a uniform solid solution $Li_5Fe_xM_{1-x}O_4$ can be formed, and the composite metal oxide material can be guaranteed to have a high charging gram capacity.

In some embodiments, the time for the first thermal insulation sintering can be from 4 h to 10 h. Optionally, the time for the first thermal insulation sintering is from 4 h to 8 h, from 5 h to 8 h, or from 5 h to 7 h.

In some embodiments, the second heating rate can be from 2° C./min to 10° C./min, from 3° C./min to 10° C./min, from 4° C./min to 8° C./min, or from 5° C./min to 7° C./min.

In some embodiments, the temperature of the second thermal insulation sintering can be from 600° C. to 1000° C. Optionally, the temperature of the second thermal insulation sintering is from 650° C. to 1000° C., from 700° C. to 1000° C., from 650° C. to 900° C., from 700° C. to 900° C., from 800° C. to 950° C., or from 800° C. to 900° C. For example, the temperature of the second thermal insulation sintering may be 700° C., 800° C., 850° C., 900° C., or 1000° C. The inventors found that if the temperature of the second thermal insulation sintering is too low, it may be impossible to form a composite metal oxide material with uniformity and high crystallinity, which is not conducive to the charging capacity of the composite metal oxide material; if the temperature of the second thermal insulation sintering is too high, the volatilization of Li element in the Li source increases, the active lithium content in the composite metal oxide material will decrease, and it may be impossible to form a uniform and dense coating layer on the surface of the central layer, which affects the stability of the central core. In addition, if the temperature of the second thermal insulation sintering is too high, it is easy to change the coating material of the coating layer from $LiMO_2$ to the oxide of M. The oxide of M does not have the function of conducting active lithium, which is not conducive to extracting active lithium from the central core. Therefore, the charging gram capacity of the composite metal oxide material will be reduced. When the temperature of the second thermal insulation sintering is within a suitable range, the coating effect of the coating layer on the central core is better, which is more conducive to the exertion of the high charging capacity of the composite metal oxide material.

In some embodiments, the time of the second thermal insulation sintering can be from 2 h to 6 h. Optionally, the time for the second thermal insulation sintering is from 3 h to 6 h, from 4 h to 6 h, or from 5 h to 6 h.

In some embodiments, the types of Li source, Fe source, and M source are not specifically limited, and can be selected according to actual needs. As an example, the Li source may include one or more of $Li_2O$, $Li_2CO_3$, $Li_2C_2O_4$, $CH_3COOLi$, $LiOH \cdot H_2O$, and $LiOH$. As an example, the Fe source may include one or more of oxides, hydroxides, halides, sulfates, carbonates, nitrates, oxalates, and acetates of Fe. As an example, the M source may include one or more of oxides, hydroxides, halides, sulfates, carbonates, nitrates, oxalates, acetates, sulfides, and nitrides of M.

In some embodiments, the Li source, Fe source, M source are mixed at a molar ratio of a:b:c (Li:Fe:M), in which $5 \leq a \leq 6$, $0.6 \leq b \leq 1$, $0 \leq c \leq 0.4$.

Optionally, the range of a satisfies $5.1 \leq a \leq 5.9$, $5.2 \leq a \leq 5.8$, $5.3 \leq a \leq 5.7$, or $5.4 \leq a \leq 5.6$.

Optionally, the range of b satisfies $0.7 \leq b \leq 1$, $0.8 \leq b \leq 1$, $0.85 \leq b \leq 1$, $0.85 \leq b \leq 0.95$, or $0.85 \leq b \leq 0.9$.

Optionally, the range of c satisfies $0 \leq c \leq 0.4$, $0 \leq c \leq 0.3$, $0 \leq c \leq 0.2$, $0.05 \leq c \leq 0.2$, or $0.05 \leq c \leq 0.15$.

In some embodiments, the preparation method of the composite metal oxide material may further the step of grinding the raw material. The raw material is ground to a certain size, then heated up and kept thermally insulated for sintering treatment, so that a composite metal oxide material with more uniform particle size and higher crystallinity can be obtained. Optionally, the grinding method is ball milling. The grinding may be performed by separately grinding the Li source, the Fe source, and the M source, or by mixing the Li source, the Fe source, and the M source and performing the grinding together.

In some embodiments, the preparation method of composite metal oxide material may further comprise the following step: pulverizing and classifying the resulting composite metal oxide material prepared, in which the composite metal oxide material with a volume average particle diameter Dv50 of 2 μm to 8 μm is screened out. Optionally, a composite metal oxide material with a volume average particle diameter Dv50 of 2 μm to 7 μm, 3 μm to 7 μm, 3 μm to 6 μm, 3 μm to 5 μm, or 4 μm to 5 μm is screened out for use in the positive electrode. Screening out the composite metal oxide material with the volume average particle size Dv50 in the appropriate range can obtain the composite metal oxide material with moderate powder particle size, which is beneficial to give full play to its advantages of high charging gram capacity.

In some embodiments, the sintering atmosphere includes one or more of nitrogen, oxygen, argon, and helium.

In some embodiments, the ambient humidity during the preparation of the composite metal oxide material can be controlled to be ≤45%. Optionally, the ambient humidity during the preparation of the composite metal oxide material can be controlled to be ≤40%, ≤30%, ≤20%, ≤10%, or ≤5%. During the preparation of composite metal oxide materials, controlling the environmental humidity within an appropriate range can reduce the reaction between the central core of the composite metal oxide material and the moisture and carbon dioxide in the air, thereby greatly reducing the loss of active lithium in the composite metal oxide material.

Secondary Battery

The secondary battery, also known as a rechargeable battery or a storage battery, refers to a battery that can continue to be used by activating the active material by means of charging after the battery is discharged.

Usually, the secondary battery comprises a positive electrode plate, a negative electrode plate, a separator and an electrolyte. During the charging and discharging process of the battery, active ions (such as lithium ions) are intercalated and deintercalated back and forth between the positive electrode and the negative electrode. The separator is arranged between the positive electrode plate and the negative electrode plate, and mainly plays the role of preventing the short circuit of the positive and negative electrodes, and at the same time, it can allow ions to pass through. Between the positive electrode and the negative electrode, the electrolyte mainly plays the role of conducting active ions.

[Positive Electrode Plate]

The present disclosure provides a positive electrode plate comprising a positive electrode current collector and a positive electrode film layer disposed on at least one surface of the positive electrode current collector, the positive electrode film layer comprising a positive active material. For example, the positive electrode current collector has two surfaces opposite in its own thickness direction, and the positive electrode film layer is provided on either or both of the two opposite surfaces of the positive electrode current collector.

In the positive electrode plate of the present disclosure, the positive electrode current collector can adopt a metal foil or a composite current collector. As an example of the metal foil, aluminum foil can be used as the positive electrode current collector. The composite current collector may comprise a polymer material base layer and a metal material layer formed on at least one surface of the polymer material base layer. As an example, the metal material may be selected from one or more of aluminum, aluminum alloy, nickel, nickel alloy, titanium, titanium alloy, silver, and silver alloy. As an example, the polymer material base layer may be selected from polypropylene (PP), polyethylene terephthalate (PET), polybutylene terephthalate (PBT), polystyrene (PS), polyethylene (PE) and the like.

In the positive electrode plate of the present disclosure, the positive electrode film layer comprises a positive active material, and the positive active material can be a positive active material known in the art for secondary batteries. As an example, the positive active material may include one or more of lithium transition metal oxides, olivine-structured lithium-containing phosphates, and their respective modified compounds. Examples of lithium transition metal oxides may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and the modified compounds thereof. Examples of olivine-structured lithium-containing phosphates may include, but are not limited to, one or more of lithium iron phosphate, composites of lithium iron phosphate and carbon, lithium manganese phosphate, composites of lithium manganese phosphate with carbon, lithium iron manganese phosphate, composites of lithium iron manganese phosphate with carbon, and the modified compounds thereof. The present disclosure is not limited to these materials, and other conventionally known materials that can be used as positive active materials for secondary batteries can also be used. These positive active materials may be used alone or in combination of two or more.

In the positive electrode plate of the present disclosure, the modified compound of each above-mentioned positive active material can be the positive active material that is subjected to doping modification, surface coating modification, or surface coating modification while doping.

In the positive electrode plate of the present disclosure, the positive electrode film layer generally comprises a positive active material and optionally a binder and optionally a conductive agent. The positive electrode film layer is usually formed by applying the positive electrode slurry on the positive electrode current collector, drying and cold pressing. The positive electrode slurry is usually formed by dispersing the positive active material, optional conductive agent, optional binder and any other components in a solvent and stirring uniformly. The solvent may be N-methylpyrrolidone (NMP), but is not limited thereto. As examples, the binder for the positive electrode film layer may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin. As an example, the conductive agent used for the positive electrode film layer may include one or more of superconducting carbon, acetylene black, carbon black, Ketjen black, carbon dots, carbon nanotubes, graphene, and carbon nanofibers.

In the positive electrode plate of the present disclosure, the positive electrode film layer further comprises one of the composite metal oxide materials of the first aspect of the present disclosure, the composite metal oxide materials prepared by the method of the second aspect of the present disclosure.

In some embodiments, based on the mass of the positive active material, the mass percentage of the composite metal oxide material may be ≤20%. Optionally, the mass percentage of the composite metal oxide material is from 1% to 20%, from 1% to 18%, from 1% to 15%, from 1% to 12%, from 1% to 10%, or from 1% to 8% %. The composite metal oxide material can supplement the loss of active lithium during the first charging process of the battery, but the central core of the composite metal oxide material becomes a deactivated material after the first charging. If the mass percentage of the composite metal oxide material is too high, it will reduce the mass energy density of the battery to a certain extent.

It should be noted that the composition or parameter of each positive electrode film layer given in the disclosure all refer to the composition or parameter range of the single film layer of the positive electrode current collector. When the positive electrode film layer is disposed on two opposite surfaces of the positive electrode current collector, the composition or parameter of the positive electrode film layer on any one of the surfaces satisfies the requirements of the present disclosure, that is to say, it is considered to fall within the protection scope of the present disclosure.

[Negative Electrode Plate]

The secondary battery comprises a negative electrode plate, which generally comprises a negative electrode current collector and a negative electrode film layer disposed on at least one surface of the negative electrode current collector, the negative electrode film layer comprising a negative active material. For example, the negative electrode current collector has two surfaces opposite in its thickness direction, and the negative electrode film layer is laminated on either or both of the two opposite surfaces of the negative electrode current collector.

In the negative electrode plate of the present disclosure, the negative electrode current collector can adopt a metal foil or a composite current collector. As an example of the metal foil, copper foil can be used. The composite current collector may comprise a polymer material base layer and a metal material layer formed on at least one surface of the polymer material base layer. As an example, the metal material may be selected from one or more of copper, copper alloy, nickel, nickel alloy, titanium, titanium alloy, silver, and silver alloy. As an example, the polymer material base layer may be selected from polypropylene (PP), polyethylene terephthalate (PET), polybutylene terephthalate (PBT), polystyrene (PS), polyethylene (PE), and the like.

In the negative electrode plate of the present disclosure, the negative electrode film layer usually comprises a negative active material and an optional binder, an optional conductive agent and other optional auxiliary agents. The negative electrode film layer is usually formed by applying the negative electrode slurry on the negative electrode current collector, drying and cold pressing. The negative electrode slurry coating is usually formed by dispersing the negative active material and optional conductive agent, optional binder, optional auxiliary agent, etc. in a solvent and stirring uniformly. The solvent may be N-methylpyrrolidone (NMP) or deionized water, but is not limited thereto. The types and contents of the conductive agent and the binder are not specifically limited, and can be selected according to actual needs. As an example, the conductive agent may include one or more of superconducting carbon, carbon black (for example, acetylene black, ketjen black, etc.), carbon dots, carbon nanotubes, graphene, and carbon nanofibers. As examples, the binder may include one or more of styrene-butadiene rubber (SBR), water-soluble unsaturated resin (SR-1B), water-dispersible acrylic resin (for example, polyacrylic acid PAA, polymethacrylic acid PMAA, sodium polyacrylate PAAS), polyacrylamide (PAM), polyvinyl alcohol (PVA), sodium alginate (SA) and carboxymethyl chitosan (CMCS). Other optional auxiliary agent may include thickeners (for example, sodium carboxymethyl cellulose CMC-Na), PTC thermistor materials, and the like.

In some embodiments, the types of negative active materials are not particularly limited, and negative active materials known in the art for secondary batteries can be used. As an example, the negative active material may include one or more of graphite, soft carbon, hard carbon, mesocarbon microspheres, carbon fibers, carbon nanotubes, silicon-based materials, tin-based materials, and lithium titanate. The silicon-based material may include one or more of elemental silicon, silicon oxide, silicon-carbon composite, silicon-nitrogen composite, and silicon alloy materials. The tin-based material may include one or more of elemental tin, tin oxide, and tin alloy materials. The present disclosure is not limited to these materials, and other conventionally known materials that can be used as negative active materials for secondary batteries can also be used. These negative active materials may be used alone or in combination of two or more.

[Electrolyte]

Electrolytes function to conduct active ions between the positive electrode plate and the negative electrode plate. This disclosure has no specific restrictions on the type of electrolytes, which can be selected according to requirements. For example, the electrolyte can be selected from at least one of a solid electrolyte and a liquid electrolyte, i.e. an electrolytic solution.

In some embodiments, the electrolytic solution is used as an electrolyte. The electrolytic solution includes electrolyte salts and solvents.

In some embodiments, the type of the electrolyte salt is not specifically limited, and can be selected according to actual needs. As an example, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

In some embodiments, the type of the solvent is not specifically limited, and can be selected according to actual needs. As an example, the organic solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, optionally, the solvent is a non-aqueous solvent.

In some embodiments, the electrolytic solution may optionally comprise an additive. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

[Separator]

Secondary batteries using an electrolytic solution, as well as some secondary batteries using solid electrolytes, further include a separator. The separator is arranged between the positive electrode plate and the negative electrode plate, which acts as isolation. This disclosure has no special restrictions on the type of separators, and any well-known porous structure separator with good chemical and mechanical stability can be selected. In some embodiments, the material of the separator may be selected from one or more of glass fiber, non-woven fabric, polyethylene, polypropylene, and polyvinylidene fluoride. The separator may be a single-layer film or a multilayer composite film. When the separator is a multilayer composite film, the materials of each layer may be the same or different.

In some embodiments, the positive electrode plate, the negative electrode plate, and the separator may form an electrode assembly by winding or stacking.

In some embodiments, the secondary battery may include an outer package for packaging the above-mentioned electrode assembly and electrolyte.

In some embodiments, the outer package of the secondary battery may be a hard case, such as a hard plastic case, an aluminum case, a steel case, and the like. The outer package of the secondary battery may also be a soft bag, such as a pocket type soft bag. The material of the soft bag may be plastic, for example, it may include one or more of polypropylene (PP), polybutylene terephthalate (PBT), polybutylene succinate (PBS), and the like.

The present disclosure does not have particular limitation to the shape of the secondary battery. The secondary battery may be cylindrical, square, or in other arbitrary shape. FIG. 1 shows a secondary battery 5 with a square structure as an example.

Figure 2:
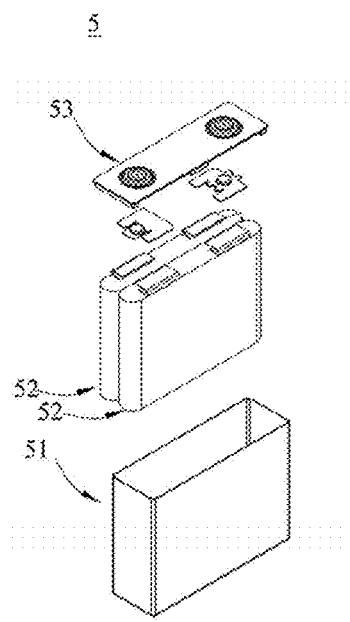
FIG. 2 is an exploded view of an embodiment of a secondary battery according to the present disclosure.

In some embodiments, referring to FIG. 2, the outer package may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity. The positive electrode plate, the negative electrode plate, and the separator may form an electrode assembly 52 by winding or stacking. The electrode assembly 52 is packaged in the receiving cavity. The electrolytic solution infiltrates the electrode assembly 52. The secondary battery 5 includes one or more electrode assemblies 52, which can be adjusted according to requirements.

In some embodiments, the secondary batteries may be assembled into a battery module, the battery module may include a plurality of secondary batteries, and the specific number can be adjusted according to the disclosure and capacity of the battery module.

Figure 3:
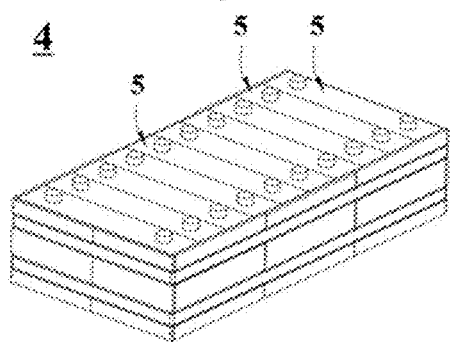
FIG. 3 is a schematic diagram of an embodiment of a battery module according to the present disclosure.

FIG. 3 shows a battery module 4 as an example. Referring to FIG. 3, in the battery module 4, a plurality of secondary batteries 5 may be arranged sequentially in a length direction of the battery module 4. Of course, they may also be arranged in any other way. Further, a plurality of secondary batteries 5 may be fixed by fasteners.

Optionally, the battery module 4 may further include a housing having a receiving space, and a plurality of secondary batteries 5 are received in the receiving space.

In some embodiments, the above-mentioned battery module may also be assembled into a battery pack, and the number of battery modules included in the battery pack can be adjusted according to the disclosure and capacity of the battery pack.

Figure 4:
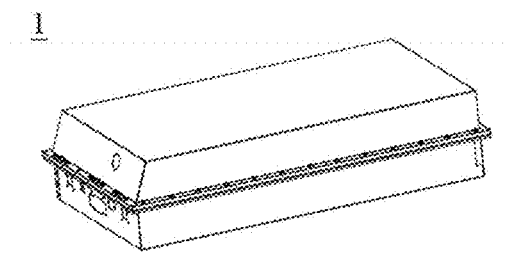
FIG. 4 is a schematic diagram of an embodiment of a battery pack according to the present disclosure.
Figure 5:
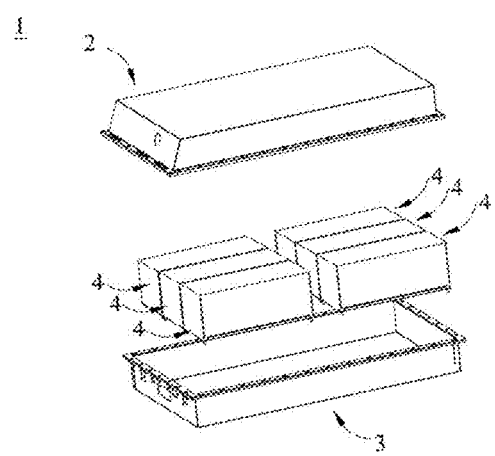
FIG. 5 is an exploded view of FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case body 2 and a lower case body 3. The upper case body 2 can cover the lower case body 3 to form a closed space for receiving the battery modules 4. A plurality of battery modules 4 can be arranged in the battery case in any manner.

Electrical Device

The embodiments of the present disclosure further provide an electrical device including at least one of the secondary battery, battery module, or battery pack of the present disclosure. The secondary battery, battery module or battery pack can be used as a power source of the electrical device, or can be used as an energy storage unit of the electrical device. The electrical device can be, but is not limited to, mobile devices (such as mobile phones, notebook computers), electric vehicles (such as pure electric vehicles, hybrid electric vehicles, plug-in hybrid electric vehicles, electric bicycles, electric scooters, electric golf carts, electric trucks.), electric trains, ships and satellites, energy storage systems, etc.

A secondary battery, a battery module, or a battery pack can be selected for the electrical device according to its usage requirements.

Figure 6:
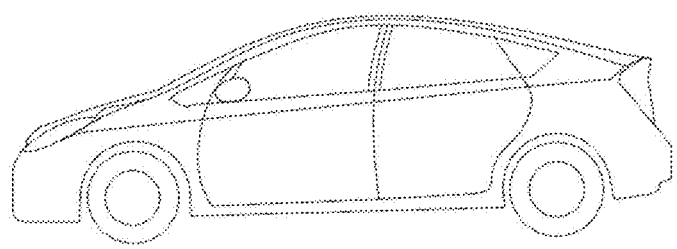
FIG. 6 is a schematic diagram of an embodiment of an electrical device in which the secondary battery of the present disclosure is used as a power source.

FIG. 6 is an electrical device as an example. The electrical device is a pure electric vehicle, a hybrid electric vehicle, or a plug-in hybrid electric vehicle. In order to meet the requirements of the electrical device for high power and high energy density, a battery pack or a battery module can be used.

As another example, the electrical device may be a mobile phone, a tablet computer, a notebook computer, etc. Such electrical device is generally required to be thin and light, and a secondary battery can be used as a power source.

EXAMPLE

The following examples are intended to describe the disclosure of the present disclosure, and are intended to be illustrative only, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

Li source ($Li_2O$), Fe source ($Fe_2O_3$), M source ($Al_2O_3$) were mixed at a ratio of 5.01:0.9:0.11 (the element molar ratio of Li, Fe, M); the raw materials after mixing were subjected to the first heating to the first thermal insulation sintering temperature of 650° C. and sintered for 6 h, and then subjected to the second heating to the second thermal insulation sintering temperature of 850° C. and sintered from 5 h. After cooling and discharging, a composite metal oxide material was obtained.

Examples 2-32

The preparation of the composite metal oxide material was similar to that in Example 1, with the difference that the content of the relevant raw materials, the temperature for thermal insulation sintering and the time for thermal insulation sintering in the preparation of the composite metal oxide material were adjusted. The specific preparation parameters of the composite metal oxide material were shown in Table 1.

Comparative Example 1

$Li_5Fe_{0.9}Al_{0.1}O_4$ was directly used as the composite metal oxide material. The Li source, the Fe source, and the Al source were mixed at a ratio of 5:0.9:0.1 (the elemental molar ratio of Li, Fe, and Al), and the mixed raw materials were heated to 850° C. and sintered for 5 hours. After cooling down and discharging, the composite metal oxide material was obtained.

Comparative Example 2

The mixture obtained by simple mechanical mixing of $Li_5Fe_{0.9}Al_{0.1}O_4$ and $LiCoO_2$ was directly used as the composite metal oxide material.

Comparative Example 3

Li source ($Li_2O$), Fe source ($Fe_2O_3$), Al source ($Al_2O_3$) Co source ($Co_2O_3$) were mixed at a ratio of 5.05:0.9:0.1:0.05 (the element molar metering ratio of Li, Fe, Al, Co); the raw materials after mixing were subjected to the first heating to the first thermal insulation sintering temperature of 650° C. and sintered for 6 h, and then subjected to the second heating to the second thermal insulation sintering temperature of 850° C. and sintered from 5 h. After cooling and discharging, a composite metal oxide material was obtained.

Comparative Example 4

The preparation of composite metal oxide material was similar to that of Example 1, with the difference that the content of relevant raw materials, the thermal insulation sintering temperature and the thermal insulation sintering time in the preparation of composite metal oxide material were adjusted, and specific preparation parameters were shown in Table 1.

Comparative Example 5

The preparation of composite metal oxide material was similar to that of Example 1, with the difference that the content of relevant raw materials, the thermal insulation sintering temperature and the thermal insulation sintering time in the preparation of composite metal oxide material were adjusted, and specific preparation parameters were shown in Table 1.

of all Fe element was denoted as f, and the mass percentage of all M elements was denoted as m. l, f and m can be determined by ICP (Inductively Coupled Plasma) atomic emission spectrometry. The test can be performed in an inductively coupled plasma atomic emission spectrometer (for example, ICAP7400 from Thermo Fisher Scientific, USA). An exemplary test method was as follows: adding 2 g of the composite metal oxide material to an acid solution (such as aqua regia) for digestion, in which the digestion can

TABLE 1

| No. | M | Element molar ratio of Li, Fe, M | First thermal insulation sintering temperature (° C.) | First thermal insulation sintering time (h) | Second thermal insulation sintering temperature (° C.) | Second thermal insulation sintering time (h) |
|---|---|---|---|---|---|---|
| Example 1 | Al | 5.01:0.9:0.11 | 650 | 6 | 850 | 5 |
| Example 2 | Al | 5.02:0.9:0.12 | 650 | 6 | 850 | 5 |
| Example 3 | Al | 5.05:0.9:0.15 | 650 | 6 | 850 | 5 |
| Example 4 | Al | 5.08:0.9:0.18 | 650 | 6 | 850 | 5 |
| Example 5 | Al | 5.14:0.9:0.24 | 650 | 6 | 850 | 5 |
| Example 6 | Al | 5.05:0.6:0.45 | 650 | 4 | 850 | 5 |
| Example 7 | Al | 5.05:0.8:0.25 | 650 | 5 | 850 | 5 |
| Example 8 | Al | 5.05:0.85:0.2 | 650 | 5.5 | 850 | 5 |
| Example 9 | Al | 5.05:0.95:0.1 | 650 | 6.5 | 850 | 5 |
| Example 10 | Al | 5.05:0.9:0.15 | 500 | 6 | 850 | 5 |
| Example 11 | Al | 5.05:0.9:0.15 | 600 | 6 | 850 | 5 |
| Example 12 | Al | 5.05:0.9:0.15 | 700 | 6 | 850 | 5 |
| Example 13 | Al | 5.05:0.9:0.15 | 800 | 6 | 850 | 5 |
| Example 14 | Al | 5.05:0.9:0.15 | 650 | 6 | 600 | 5 |
| Example 15 | Al | 5.05:0.9:0.15 | 650 | 6 | 700 | 5 |
| Example 16 | Al | 5.05:0.9:0.15 | 650 | 6 | 800 | 5 |
| Example 17 | Al | 5.05:0.9:0.15 | 650 | 6 | 900 | 5 |
| Example 18 | Al | 5.05:0.9:0.15 | 650 | 6 | 1000 | 5 |
| Example 19 | Al | 5.05:0.9:0.15 | 650 | 6 | 850 | 5 |
| Example 20 | Al | 5.05:0.9:0.15 | 650 | 6 | 850 | 5 |
| Example 21 | Al | 5.05:0.9:0.15 | 650 | 6 | 850 | 5 |
| Example 22 | Al | 5.05:0.9:0.15 | 650 | 6 | 850 | 5 |
| Example 23 | Al | 5.05:0.7:0.5 | 650 | 4.5 | 850 | 4 |
| Example 24 | Al | 5.05:0.9:0.107 | 400 | 8 | 600 | 6 |
| Example 25 | Al | 5.05:0.98:0.07 | 900 | 7.5 | 850 | 5.5 |
| Example 26 | Al | 5.05:0.9:0.15 | 650 | 6 | 1100 | 5 |
| Example 27 | Mn | 5.05:0.9:0.15 | 650 | 6 | 850 | 5 |
| Example 28 | Co | 5.05:0.9:0.15 | 650 | 6 | 850 | 5 |
| Example 29 | Ni | 5.05:0.9:0.15 | 650 | 6 | 850 | 5 |
| Example 30 | Cu | 5.05:0.9:0.15 | 650 | 6 | 850 | 5 |
| Example 31 | Ga | 5.05:0.9:0.15 | 650 | 6 | 850 | 5 |
| Example 32 | Al | 5.05:0.9:0.39 | 650 | 5 | 850 | 4.5 |
| Comparative Example 1 | Al | 5:0.9:0.1 | / | / | 850 | 5 |
| Comparative Example 2 | / | / | / | / | / | / |
| Comparative Example 3 | Al; Co | 5.05:0.9:0.1(Al):0.05(Co) | 650 | 6 | 850 | 5 |
| Comparative Example 4 | Al | 5.05:0.5:0.55 | 650 | 6 | 850 | 5 |
| Comparative Example 5 | Sb | 5.05:0.9:0.15 | 650 | 6 | 850 | 5 |

Performance Test of Composite Metal Oxide Material
(1) x Value of Composite Metal Oxide Material The mass percentage of $Li_5Fe_xM_{1-x}O_4$ in the composite metal oxide material was defined as a, and the relative molecular mass of $Li_5Fe_xM_{1-x}O_4$ was denoted as $M_{LFMO}$. The mass percentage of $LiMO_2$ in the composite metal oxide material was defined as b, and the relative molecular mass of $LiMO_2$ was recorded as $M_{LMO}$, and a+b=1. The relative atomic mass of Li element in $LiMO_2$ was $M_{Li}$=6.94, the relative atomic mass of Fe element in $Li_5Fe_xM_{1-x}O_4$ was $M_{Fe}$=55.845, and the relative atomic mass of M element was recorded as $M_M$.

In the composite metal oxide material, the mass percentage of all Li elements was denoted as l, the mass percentage be carried out under stirring (such as mechanical stirring or microwave stirring, etc.), and the digestion time can be 30 min; adding the resulting solution to the ICAP7400 spectrometer to quantitatively analyze the chemical constituent elements in the composite metal oxide material.

In the composite metal oxide material, the mass percentage of Li element of $Li_5Fe_xM_{1-x}O_4$ was denoted as $l_1$, and the mass percentage of Li element of $LiMO_2$ was denoted as $l_2$, $l_1+l_2=1$.

In the composite metal oxide material, the mass percentage of M element of $Li_5Fe_xM_{1-x}O_4$ was denoted as $m_1$, and the mass percentage composition of M element of $LiMO_2$ was denoted as $m_2$, $m_1+m_2=m$.

In $Li_5Fe_xM_{1-x}O_4$, the sum of the mole fractions of Fe element and M element and the mole fraction of Li element satisfied: $(f/M_{Fe}+m_1/M_M):(l_1/M_{Li})=1:5$.

In $LiMO_2$, the mole fraction of M element and the mole fraction of Li element satisfied: $(m_2/M_M):(l_2/M_{Li})=1:1$.

It can be calculated from above-mentioned equations that: $m_2=5m/4+(5M_M\times f)/4M_{Fe}-1\times M_M/4M_{Li}$, where m, $M_M$, f, $M_{Fe}$, l, $M_{Li}$ all were known parameters. Therefore, the x value of the composite metal oxide material can be calculated by $x=m_2/m$.

(2) Test for Molar Ratio of Fe and M in the Transition Layer of Composite Metal Oxide Materials A X-Max energy spectrometer (EDS) from British Oxford Instrument Group in combination with Sigma-02-33 scanning electron microscope (SEM) from Germany ZEISS was used to measure the mass concentration of Fe and M in the transition layer of composite metal oxide material. Three sites were selected for testing, and the average value was used as the mass concentration of Fe and M, and then the molar ratio of Fe and M was calculated.

(3) Test for Charging Gram Capacity of Composite Metal Oxide Materials

The composite metal oxide material, carbon black (Super P) as a conductive agent, polyvinylidene fluoride (PVDF) as a binder were dispersed in N-methylpyrrolidone (NMP) as a solvent at a mass ratio of 80:10:10, fully stirred and mixed to obtain a positive electrode slurry. The positive electrode slurry was applied on one surface of aluminum foil as the positive electrode current collector; after dried and cold pressed, a positive electrode plate was obtained. Ethylene carbonate (EC) and ethyl methyl carbonate (EMC) were mixed uniformly at a mass ratio of 30:70 to obtain an organic solvent; then the lithium salt $LiPF_6$ was dissolved in the above organic solvent, and mixed uniformly to obtain an electrolyte, wherein the concentration of $LiPF_6$ was 1 mol/L. A lithium sheet as a counter electrode and the positive electrode plate were assembled into a button cell.

The button cell was charged to 4.5V with a constant current of 0.05 C rate, left standstill for 5 min, and at this time the charging capacity of the button cell was recorded.

The charging gram capacity of the composite metal oxide material was calculated from the charging capacity of the button cell. The charging gram capacity of the composite metal oxide material (mAh/g)=the charging capacity of the button cell/the mass of the composite metal oxide material.

The test result of the performance of Examples 1-32 and Comparative Examples 1-5 were shown in Table 2.

TABLE 2

| No. | $Li_5Fe_xM_{1-x}O_4$ | $LiMO_2$ Chemical formula | $LiMO_2$ Mass percentage (%) | Transition layer Molar ratio of Fe to M | Transition layer $H_{max}$ (μm) | Median particle size of the composite metal oxide Dv50 (μm) | Charging gram capacity of the composite metal oxide (mAh/g) |
|---|---|---|---|---|---|---|---|
| Example 1 | $Li_5Fe_{0.9}Al_{0.1}O_4$ | $LiAlO_2$ | 0.5 | 1.8 | 0.1 | 4.5 | 665.5 |
| Example 2 | $Li_5Fe_{0.9}Al_{0.1}O_4$ | $LiAlO_2$ | 1 | 1.7 | 0.3 | 4.5 | 674.3 |
| Example 3 | $Li_5Fe_{0.9}Al_{0.1}O_4$ | $LiAlO_2$ | 2 | 1.5 | 0.5 | 4.5 | 682.6 |
| Example 4 | $Li_5Fe_{0.9}Al_{0.1}O_4$ | $LiAlO_2$ | 3 | 1.2 | 0.7 | 4.5 | 676.1 |
| Example 5 | $Li_5Fe_{0.9}Al_{0.1}O_4$ | $LiAlO_2$ | 5 | 0.9 | 0.9 | 4.5 | 667.4 |
| Example 6 | $Li_5Fe_{0.6}Al_{0.4}O_4$ | $LiAlO_2$ | 2 | 1.15 | 0.5 | 4.5 | 658.4 |
| Example 7 | $Li_5Fe_{0.8}Al_{0.2}O_4$ | $LiAlO_2$ | 2 | 1.25 | 0.5 | 4.5 | 669.2 |
| Example 8 | $Li_5Fe_{0.85}Al_{0.15}O_4$ | $LiAlO_2$ | 2 | 1.35 | 0.5 | 4.5 | 673.4 |
| Example 9 | $Li_5Fe_{0.95}Al_{0.05}O_4$ | $LiAlO_2$ | 2 | 1.55 | 0.5 | 4.5 | 671.5 |
| Example 10 | $Li_5Fe_{0.9}Al_{0.1}O_4$ | $LiAlO_2$ | 2 | 1.5 | 0.5 | 4.5 | 661.2 |
| Example 11 | $Li_5Fe_{0.9}Al_{0.1}O_4$ | $LiAlO_2$ | 2 | 1.5 | 0.5 | 4.5 | 672.8 |
| Example 12 | $Li_5Fe_{0.9}Al_{0.1}O_4$ | $LiAlO_2$ | 2 | 1.5 | 0.5 | 4.5 | 673.9 |
| Example 13 | $Li_5Fe_{0.9}Al_{0.1}O_4$ | $LiAlO_2$ | 2 | 1.5 | 0.5 | 4.5 | 663.5 |
| Example 14 | $Li_5Fe_{0.9}Al_{0.1}O_4$ | $LiAlO_2$ | 2 | 1.5 | 0.5 | 4.5 | 653.4 |
| Example 15 | $Li_5Fe_{0.9}Al_{0.1}O_4$ | $LiAlO_2$ | 2 | 1.5 | 0.5 | 4.5 | 662.7 |
| Example 16 | $Li_5Fe_{0.9}Al_{0.1}O_4$ | $LiAlO_2$ | 2 | 1.5 | 0.5 | 4.5 | 677.8 |
| Example 17 | $Li_5Fe_{0.9}Al_{0.1}O_4$ | $LiAlO_2$ | 2 | 1.5 | 0.5 | 4.5 | 678.2 |
| Example 18 | $Li_5Fe_{0.9}Al_{0.1}O_4$ | $LiAlO_2$ | 2 | 1.5 | 0.5 | 4.5 | 663.2 |
| Example 19 | $Li_5Fe_{0.9}Al_{0.1}O_4$ | $LiAlO_2$ | 2 | 1.5 | 0.5 | 2 | 667.1 |
| Example 20 | $Li_5Fe_{0.9}Al_{0.1}O_4$ | $LiAlO_2$ | 2 | 1.5 | 0.5 | 3 | 673.1 |
| Example 21 | $Li_5Fe_{0.9}Al_{0.1}O_4$ | $LiAlO_2$ | 2 | 1.5 | 0.5 | 6 | 675.2 |
| Example 22 | $Li_5Fe_{0.9}Al_{0.1}O_4$ | $LiAlO_2$ | 2 | 1.5 | 0.5 | 8 | 666.9 |
| Example 23 | $Li_5Fe_{0.7}Al_{0.3}O_4$ | $LiAlO_2$ | 7 | 1.2 | 1 | 1 | 654.1 |
| Example 24 | $Li_5Fe_{0.9}Al_{0.1}O_4$ | $LiAlO_2$ | 0.2 | 2 | 0.05 | 4.5 | 652.7 |
| Example 25 | $Li_5Fe_{0.98}Al_{0.02}O_4$ | $LiAlO_2$ | 2 | 1.85 | 0.5 | 4.5 | 653.6 |
| Example 26 | $Li_5Fe_{0.9}Al_{0.1}O_4$ | $LiAlO_2$ | 2 | 1.5 | 0.5 | 9 | 654.5 |
| Example 27 | $Li_5Fe_{0.9}Mn_{0.1}O_4$ | $LiMnO_2$ | 2 | 1.5 | 0.5 | 4.5 | 678.5 |
| Example 28 | $Li_5Fe_{0.9}Co_{0.1}O_4$ | $LiCoO_2$ | 2 | 1.5 | 0.5 | 4.5 | 679.3 |
| Example 29 | $Li_5Fe_{0.9}Ni_{0.1}O_4$ | $LiNiO_2$ | 2 | 1.5 | 0.5 | 4.5 | 678.8 |
| Example 30 | $Li_5Fe_{0.9}Cu_{0.1}O_4$ | $LiCuO_2$ | 2 | 1.5 | 0.5 | 4.5 | 681.8 |
| Example 31 | $Li_5Fe_{0.9}Ga_{0.1}O_4$ | $LiGaO_2$ | 2 | 1.5 | 0.5 | 4.5 | 680.4 |
| Example 32 | $Li_5Fe_{0.9}Al_{0.1}O_4$ | $LiAlO_2$ | 10 | 0.6 | 1.3 | 4.5 | 644.7 |
| Comparative Example 1 | $Li_5Fe_{0.9}Al_{0.1}O_4$ | / | / | / | / | 4.5 | 550.8 |
| Comparative Example 2 | $Li_5Fe_{0.9}Al_{0.1}O_4$ | $LiAlO_2$ | 2 | / | / | 4.5 | 601.5 |
| Comparative Example 3 | $Li_5Fe_{0.9}Al_{0.1}O_4$ | $LiCoO_2$ | 2 | / | / | 4.5 | 623.4 |
| Comparative Example 4 | $Li_5Fe_{0.5}Al_{0.5}O_4$ | $LiAlO_2$ | 2 | 0.2 | 0.5 | 4.5 | 641.3 |

TABLE 2-continued

| No. | $Li_5Fe_xM_{1-x}O_4$ | LiMO₂ Chemical formula | LiMO₂ Mass percentage (%) | Transition layer Molar ratio of Fe to M | Transition layer $H_{max}$ (μm) | Median particle size of the composite metal oxide Dv50 (μm) | Charging gram capacity of the composite metal oxide (mAh/g) |
|---|---|---|---|---|---|---|---|
| Comparative Example 5 | $Li_5Fe_{0.9}Sb_{0.1}O_4$ | $LiSbO_2$ | 2 | 0.5 | 0.5 | 4.5 | 610.6 |

Figure 7:
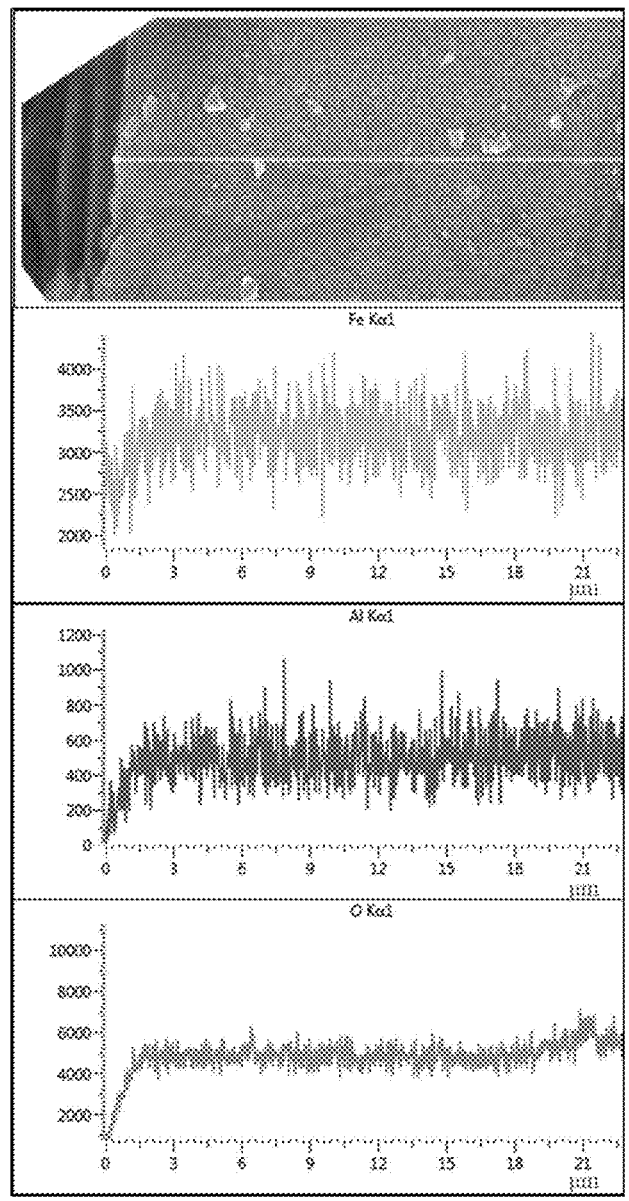
FIG. 7 is the cross-section line scan element distribution diagram of the central core of the composite metal oxide material of Example 1.
Figure 8:
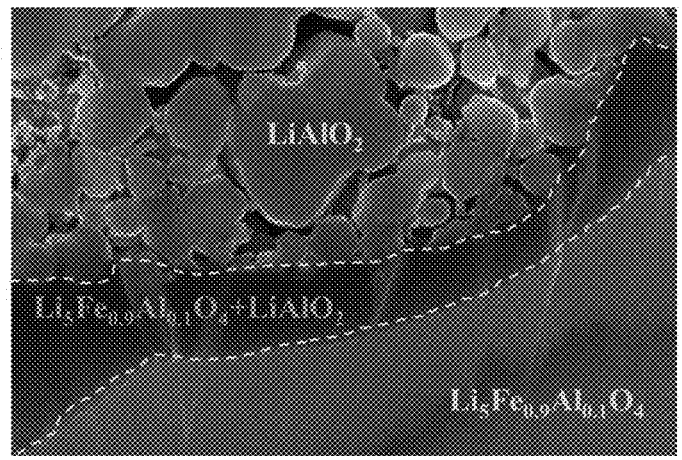
FIG. 8 is a cross-sectional scanning electron microscope (SEM) image of the composite metal oxide material of Example 1.
Figure 9:
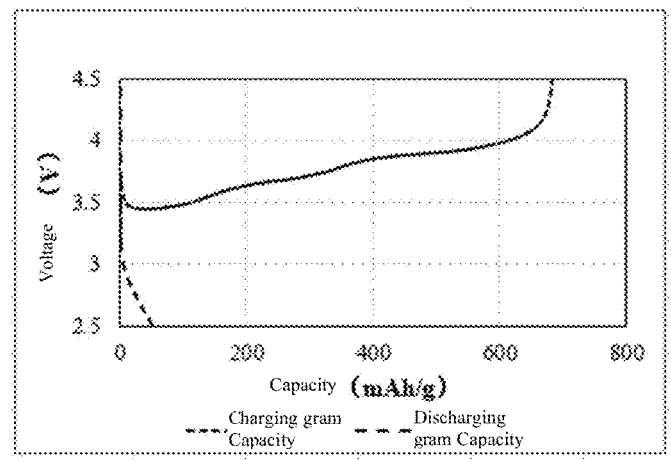
FIG. 9 is the first charge-discharge curve of the composite metal oxide material of Example 1.

As can be seen from the data in Table 2, the composite metal oxide material of the present disclosure had a high charging gram capacity. FIG. 7 was a cross-sectional line scan element distribution diagram of the central core of the composite metal oxide material of Example 1. It can be seen from FIG. 7 that Fe and M elements were uniformly distributed in the central core material, which was more conducive to the exertion of the charging gram capacity of the central core material. FIG. 8 was a scanning electron microscope (SEM) image of the composite metal oxide material of Example 1. It can be seen from FIG. 8 that when the metal element M of the central core material and the coating layer material was the same, a good interface can be formed between the central core and the coating layer, where the central core and the coating layer were bonded by chemical bonding so as to achieve higher interface bonding strength and also a better coating effect of the coating layer on the central core. The formation of a good interface between the central core and the coating layer can also improve the transport performance of active lithium at the interface between the central core and the coating layer, which was conducive to the efficient extraction of active lithium from the central core material, so as to give full play to the advantages of the high charging gram capacity of the composite metal oxide material. FIG. 9 was the first charge-discharge curve of the composite metal oxide material of Example 1. It can be seen from FIG. 9 that the composite metal oxide material of the present disclosure can have significantly improved charging capacity.

In Comparative Example 1 $Li_5Fe_{0.9}Al_{0.1}O_4$ was directly used as the composite metal oxide material (without $LiMO_2$ coating). Because $Li_5Fe_{0.9}Al_{0.1}O_4$ was unstable in air, easily reacted with the moisture and carbon dioxide in the environment, this results in a lower charging gram capacity of the composite metal oxide material.

Figure 10:
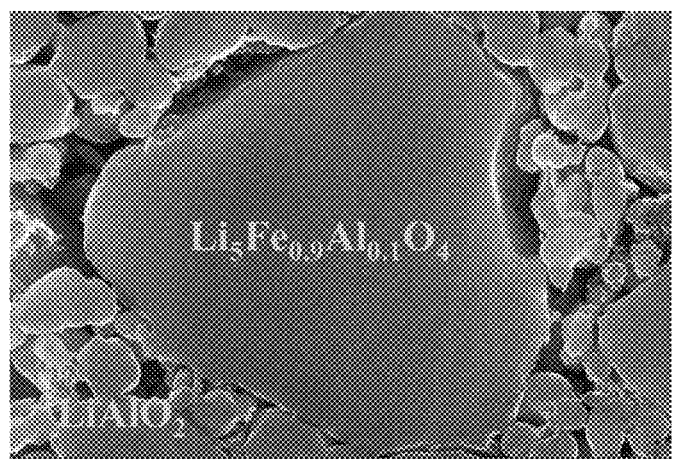
FIG. 10 is a cross-sectional scanning electron microscope (SEM) image of the composite metal oxide material of Comparative Example 2.

In Comparative Example 2 the mixture of $Li_5Fe_{0.9}Al_{0.1}O_4$ and $LiCoO_2$ that was obtained by simple mechanical mixing was used as the composite metal oxide material. FIG. 10 was a scanning electron microscope (SEM) image of the composite metal oxide material of Comparative Example 2. It can be seen from FIG. 10 that directly mixing $Li_5Fe_{0.9}Al_{0.1}O_4$ and $LiCoO_2$ did not form a transition layer structure, and that $LiCoO_2$ did not well coat the surface of $Li_5Fe_{0.9}Al_{0.1}O_4$, which cannot effectively avoid the reaction of $Li_5Fe_{0.9}Al_{0.1}O_4$ with moisture and carbon dioxide in the environment, so the charging gram capacity of the composite metal oxide material was low.

Figure 11:
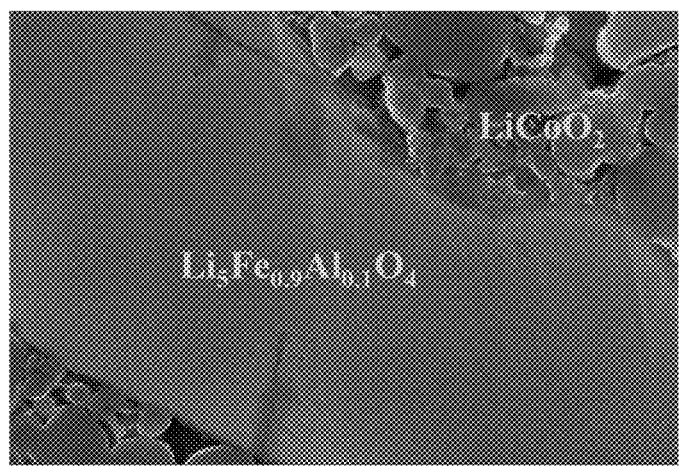
FIG. 11 is a cross-sectional scanning electron microscope (SEM) image of the composite metal oxide material of Comparative Example 3.

In the composite metal oxide material of Comparative Example 3, the central core material and the coating layer material contained different metal elements. FIG. 11 was a scanning electron microscope (SEM) image of the composite metal oxide material of Comparative Example 3. It can be seen from FIG. 11 that the interface between the central core and the coating layer was deficient, and the coating layer cannot function well to effectively avoid the reaction between the central core material and the moisture and carbon dioxide in the environment, and the interface between the central core and the coating layer cannot promote the efficient extraction of active lithium from the central core material. Therefore, the charging gram capacity of the composite metal oxide materials was low.

In the composite metal oxide material of Comparative Example 4, the value of x was too small, and the content of Fe element in the central core material was too low, and the charging gram capacity of composite metal oxide material was obviously reduced.

In the composite metal oxide material of Comparative Example 5, the +3-valence ion radii of Sb and Fe differed too much, and Sb cannot well enter the lattice structure of $Li_5FeO_4$ to partly replace the Fe element. Sb and $Li_5FeO_4$ cannot form a solid solution, and it was difficult for the active lithium to be extracted from the central core material. Therefore, the charging gram capacity of the composite metal oxide material was low.

Example 33

Preparation of Positive Electrode Plate $LiFePO_4$ as a positive active material, carbon black (Super P) as a conductive agent, polyvinylidene fluoride (PVDF) as a binder, the composite metal oxide material prepared in Example 1 were dispersed at a mass ratio of 91.6:1.6:2.2:4.6 in a solvent N-methylpyrrolidone (NMP), fully stirred and mixed to obtain a positive electrode slurry. The positive electrode slurry was applied on two opposite surfaces of aluminum foil as the positive electrode current collector. After dried and cold pressed, a positive electrode plate was obtained.

Preparation of Negative Electrode Plate

Artificial graphite as a negative active material, carbon black (Super P) as a conductive agent, styrene-butadiene rubber (SBR) as a binder and sodium carboxymethyl cellulose (CMC-Na) as a thickener at a mass ratio of 96:1.5:1.5:1.0 were dispersed in deionized water as a solvent, and after stirred and mixed evenly, a negative electrode slurry was obtained. The negative electrode slurry was applied on two opposite surfaces of copper foil as the negative electrode current collector. After dried and cold pressed, a negative electrode plate was obtained.

Preparation of Electrolyte

Ethylene carbonate (EC) and ethyl methyl carbonate (EMC) were mixed at a mass ratio of 30:70 to obtain an organic solvent; lithium salt $LiPF_6$ was then dissolved in above-mentioned organic solvent, mixed to obtain an electrolyte, where the concentration of $LiPF_6$ was 1 mol/L.

Preparation of Secondary Battery

The positive electrode plate, the polyethylene (PE) porous separator, the negative electrode plate were stacked in order, and then were wound to obtain an electrode assembly. The electrode assembly was packed into an outer package, injected with the electrolyte and encapsulated to obtain a secondary battery.

Example 34

The preparation of the secondary battery was similar to that of Example 33, except that the positive active material was $LiCoO_2$.

Example 35

The preparation of the secondary battery was similar to that of Example 33, except that the positive active material was $LiNi_{0.8}Co_{0.1}Mn_{0.1}O_2$.

Example 36

The preparation of the secondary battery was similar to that of Example 33, except that the mass ratio of the positive active material $LiFePO_4$, the conductive agent carbon black (Super P), the binder polyvinylidene fluoride (PVDF), the composite metal oxide material prepared in Example 1 was 95.24:1.6:2.2:0.96.

Example 37

The preparation of the secondary battery was similar to that of Example 33, except that the mass ratio of the positive active material $LiFePO_4$, the conductive agent carbon black (Super P), the binder polyvinylidene fluoride (PVDF), the composite metal oxide material prepared in Example 1 was 93.8:1.6:2.2:2.4.

Example 38

The preparation of the secondary battery was similar to that of Example 33, except that the mass ratio of the positive active material $LiFePO_4$, the conductive agent carbon black (Super P), the binder polyvinylidene fluoride (PVDF), the composite metal oxide material prepared in Example 1 was 87.4:1.6:2.2:8.8.

Example 39

The preparation of the secondary battery was similar to that of Example 33, except that the mass ratio of the positive active material $LiFePO_4$, the conductive agent carbon black (Super P), the binder polyvinylidene fluoride (PVDF), the composite metal oxide material prepared in Example 1 was 80.2:1.6:2.2:16.0.

Example 40

The preparation of the secondary battery was similar to that of Example 33, except that the mass ratio of the positive active material $LiFePO_4$, the conductive agent carbon black (Super P), the binder polyvinylidene fluoride (PVDF), the composite metal oxide material prepared in Example 1 was 76.96:1.6:2.2:19.24.

Comparative Example 6

The preparation of the secondary battery was similar to that of Example 33, except that the composite metal oxide material was not added in the positive electrode plate.

Comparative Example 7

The preparation of the secondary battery was similar to that of Example 34, except that the composite metal oxide material was not added in the positive electrode plate.

Comparative Example 8

The preparation of the secondary battery was similar to that of Example 35, except that the composite metal oxide material was not added in the positive electrode plate.

Test for Performance of Secondary Battery (1) Test for Capacity of Secondary Battery At 25° C., the secondary battery was charged to the upper limit of the cut-off voltage with a constant current of 1 C rate, and then charged under a constant voltage to the current of 0.05 C, and the charging capacity at this time was recorded, which was the first-cycle charging capacity. The secondary battery was discharged to the lower limit of the cut-off voltage at a constant current of 1 C, and then stood for 5 minutes. This was a cyclic charge-discharge process. The discharging capacity at this time was recorded, which was the first-cycle discharging capacity. The secondary battery was subjected to a cyclic charge and discharge test according to the above method, and the discharging capacity after each cycle was recorded until the discharging capacity of the secondary battery decayed to 80% of the first-cycle discharging capacity, and the number of cycles at this time was used as the cycle life of the secondary battery.

The initial charging gram capacity (mAh/g) of the secondary battery=the first-cycle charging capacity/mass of the positive active material.

The initial discharging gram capacity (mAh/g) of the secondary battery=the first-cycle discharge capacity/the mass of the positive active material.

In the test, the charge-discharge voltage range of the secondary battery of Example 33, Examples 36-40 and Comparative Example 6 was from 2.5V to 3.65V, and the charge-discharge voltage range of the secondary battery of Example 34 and Comparative Example 7 was from 3V to 4.2V, and the charge-discharge voltage range of the secondary batteries of Example 35 and Comparative Example 8 was from 3V to 4.2V.

The test results of Examples 33-40 and Comparative Examples 6-8 were shown in Table 3.

TABLE 3

| No. | Positive active material | Composite metal oxide material | Mass percentage of composite metal oxide material | Charging gram capacity of battery (mAh/g) | Discharging gram capacity of battery (mAh/g) | Number of battery cycles |
|---|---|---|---|---|---|---|
| Example 33 | $LiFePO_4$ | $Li_5Fe_{0.9}Al_{0.1}O_4$ | 5.0% | 180.4 | 152.8 | 6200 |
| Example 34 | $LiCoCO_2$ | $Li_5Fe_{0.9}Al_{0.1}O_4$ | 5.0% | 191.2 | 172.1 | 1780 |
| Example 35 | $LiNi_{0.8}Co_{0.1}Mn_{0.1}O_2$ | $Li_5Fe_{0.9}Al_{0.1}O_4$ | 5.0% | 218.5 | 188.5 | 3015 |

TABLE 3-continued

| No. | Positive active material | Composite metal oxide material | Mass percentage of composite metal oxide material | Charging gram capacity of battery (mAh/g) | Discharging gram capacity of battery (mAh/g) | Number of battery cycles |
|---|---|---|---|---|---|---|
| Example 36 | $LiFePO_4$ | $Li_5Fe_{0.9}Al_{0.1}O_4$ | 1.0% | 155.6 | 144.9 | 5220 |
| Example 37 | $LiFePO_4$ | $Li_5Fe_{0.9}Al_{0.1}O_4$ | 2.5% | 167.2 | 148.3 | 5565 |
| Example 38 | $LiFePO_4$ | $Li_5Fe_{0.9}Al_{0.1}O_4$ | 10.0% | 184.3 | 140.5 | 5410 |
| Example 39 | $LiFePO_4$ | $Li_5Fe_{0.9}Al_{0.1}O_4$ | 20.0% | 188.2 | 136.3 | 5290 |
| Example 40 | $LiFePO_4$ | $Li_5Fe_{0.9}Al_{0.1}O_4$ | 25.0% | 192.1 | 130.4 | 5210 |
| Comparative Example 6 | $LiFePO_4$ | / | / | 150.2 | 144.5 | 5180 |
| Comparative Example 7 | $LiCoO_2$ | / | / | 170.3 | 164.2 | 1280 |
| Comparative Example 8 | $LiNi_{0.8}Co_{0.1}Mn_{0.1}O_2$ | / | / | 201.1 | 185.3 | 2655 |

As can be seen from the data in Table 3, when the composite metal oxide material was applied in the positive electrode plate, the charging/discharging gram capacity and the cycle life of the secondary battery can be significantly improved. This was mainly due to the fact that the composite metal oxide material can supplement the active lithium loss during the first charge of the battery. However, the mass percentage of the composite metal oxide material should not be too high, because the central core of the composite metal oxide material became a deactivated material after the first charge, and if the content was too high, the energy density of the battery will be reduced to a certain extent.

The above mentioned descriptions only show particular implementations of the present disclosure and but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be determined by the protection scope of the claims.

What is claimed is:

1. A composite metal oxide material used for a positive electrode of a secondary battery, wherein the composite metal oxide material is in a form of a particle and comprises:
   a central core, wherein the central core comprises a material having a chemical formula of $Li_5Fe_xM_{1-x}O_4$, wherein $0.6 \leq x < 1$; and
   a coating layer on a surface of the central core, wherein the coating layer comprises a material having a chemical formula of $LiMO_2$; and,
   wherein M is one or more metal elements different from Fe and with +3 valence, and an absolute value of the difference between +3-valence ion radius of Fe and +3-valence ion radius of M is ≤0.02 nm.

2. The composite metal oxide material according to claim 1, wherein an absolute value of the difference between the +3-valence ion radius of Fe and the +3-valence ion radius of M is ≤0.01 nm.

3. The composite metal oxide material according to claim 1, wherein $0.8 \leq x < 1$.

4. The composite metal oxide material according to claim 1, wherein the M has a +3-valence ion radius of from 0.040 nm to 0.070 nm.

5. The composite metal oxide material according to claim 1 wherein the composite metal oxide material further comprises: a transition layer, located between the central core and the coating layer, and a molar ratio of Fe to M in the transition layer is less than the molar ratio of Fe to M in the central core material $Li_5Fe_xM_{1-x}O_4$.

6. The composite metal oxide material according to claim 5, wherein the Fe element content in the transition layer gradually decreases from the central core to the coating layer.

7. The composite metal oxide material according to claim 5, wherein the transition layer has a thickness at the thickest part of $H_{max}$, and $H_{max}$ is ≤1 μm.

8. The composite metal oxide material according to claim 1, wherein
   M is selected from one or more in Al, Ni, Co, Mn, Cr, Cu, Nb, Ga, Mo, Ru, Rh, and Ir.

9. The composite metal oxide material according to claim 1, wherein based on the total mass of the composite metal oxide material, a mass percentage of $LiMO_2$ is from 0.5% to 5%.

10. The composite metal oxide material according to claim 1, wherein the composite metal oxide material has a volume average particle diameter Dv50 of from 2 μm to 8 μm.

11. The composite metal oxide material according to claim 1, wherein the metal element M of the central core material is the same as the metal element M of the coating layer.

12. A positive electrode plate for a secondary battery, the positive electrode plate comprising: a positive active material and a composite metal oxide material dispersed in the positive active material, wherein the composite metal oxide material is in a form of a particle and comprises:
   a central core, wherein the central core comprises a material having a chemical formula of $Li_5Fe_xM_{1-x}O_4$, $0.6 \leq x < 1$; and
   a coating layer on a surface of the central core, wherein the coating layer comprises a material having a chemical formula of $LiMO_2$; and,
   wherein M is one or more metal elements different from Fe and with +3 valence, and an absolute value of the difference between +3-valence ion radius of Fe and +3-valence ion radius of M is ≤0.02 nm.

13. The positive electrode plate according to claim 12, wherein based on the mass of the positive active material, a mass percentage of the composite metal oxide material is less than or equal to 20% (≤20%).

14. A secondary battery comprising the positive electrode plate according to claim 12.

15. The positive electrode plate according to claim 12, wherein based on the mass of the positive active material, the mass percentage of the composite metal oxide material is from 1% to 10%.

* * * * *